Oct. 28, 1924.　　　　　　　　　　　　　　　　　　　　1,512,982
J. GRAVES
DRY BATTERY CARRIER AND TESTER
Filed Sept. 25, 1919　　　2 Sheets-Sheet 1
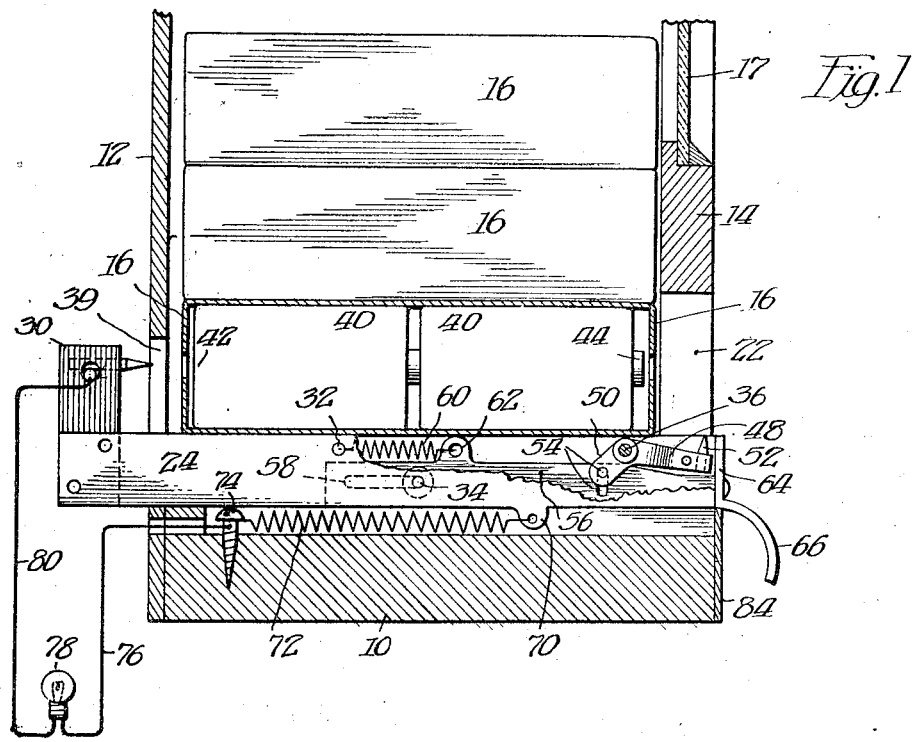
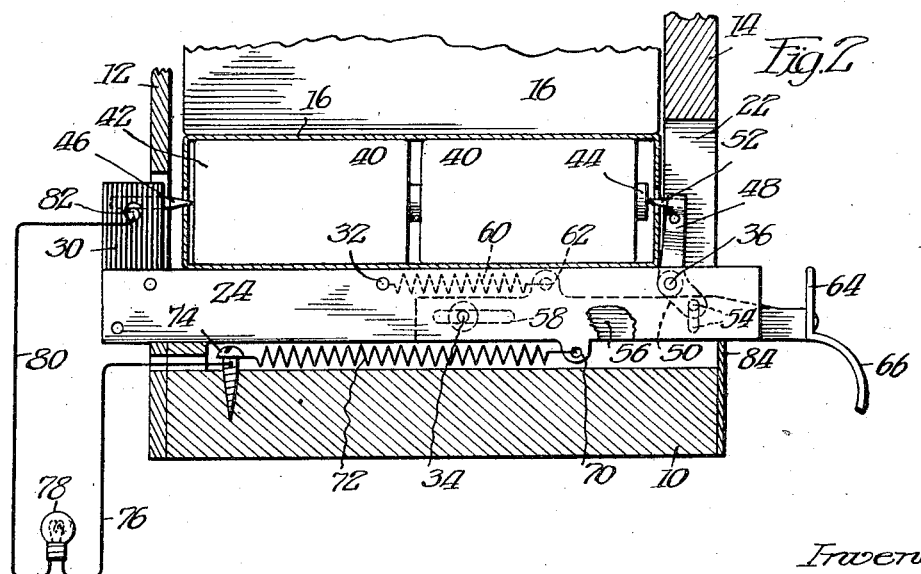
Inventor:
John Graves,
By Cheever & Cox
attys.

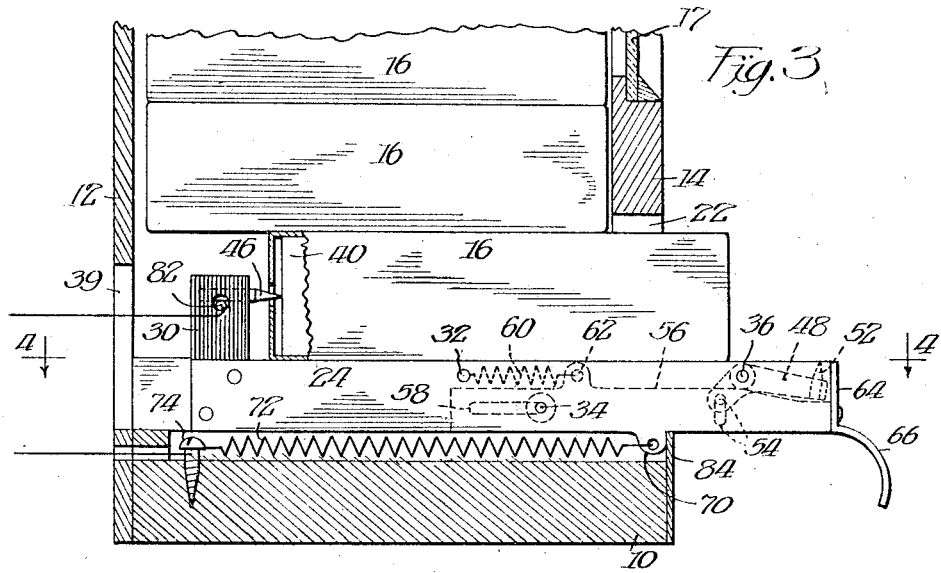
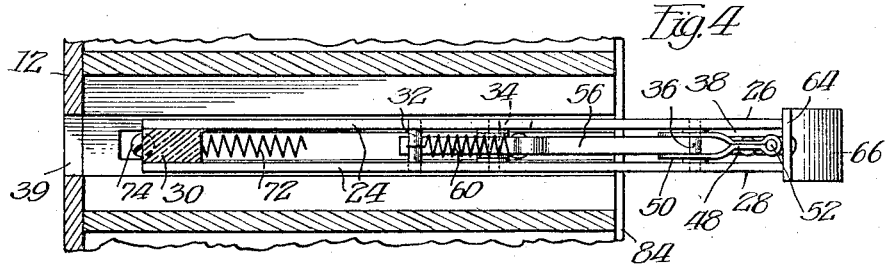
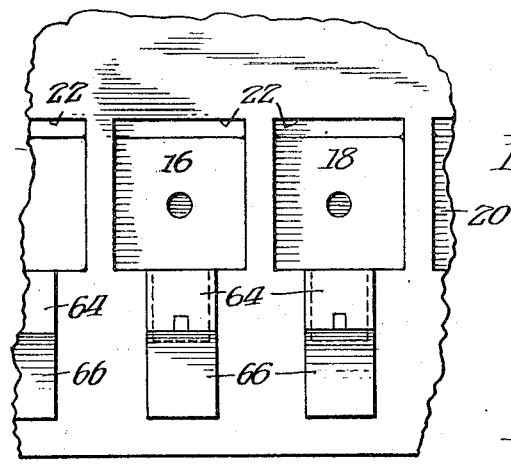

Patented Oct. 28, 1924.

1,512,982

UNITED STATES PATENT OFFICE.

JOHN GRAVES, OF MADISON, WISCONSIN, ASSIGNOR TO FRENCH BATTERY & CARBON CO., OF MADISON, WISCONSIN, A CORPORATION OF WISCONSIN.

DRY-BATTERY CARRIER AND TESTER.

Application filed September 25, 1919. Serial No. 326,307.

*To all whom it may concern:*

Be it known that I, JOHN GRAVES, a citizen of the United States, residing at Madison, in the county of Dane and State of Wisconsin, have invented a certain new and useful Improvement in Dry-Battery Carriers and Testers, of which the following is a specification.

This invention is a device for simultaneously transporting and testing the good condition of electrical equipment such as an electric battery. Without limiting the scope of the invention the particular embodiment of the invention here illustrated takes the form of a drawer or ejector mechanism for removing an electric battery from a display cabinet and testing it in the act of removing the battery. The object of the invention is to provide a device of this class.

The invention consists in means for carrying out the foregoing and other objects which can be easily and cheaply made, which is satisfactory in operation, and is not readily liable to get out of order. More particularly the invention consists in many features and details of construction hereafter fully set forth in the specification and claims.

Referring to the drawings in which like numerals represent the same parts thruout the several views.

Figure 1 is a vertical sectional detail view thru a battery cabinet having a preferred form of mechanism of this invention applied thereto, the parts being in the normal position of the cabinet when partially or wholly charged with batteries ready to be removed and tested.

Figure 2 is a changed position view of the parts in Figure 1 when the operator has started to remove the battery from the cabinet and has moved the parts to the position where testing of the battery takes place.

Figure 3 is a further changed position view showing the position of the parts when the carrier has been moved to its extreme outward position and the operator has released his hold on it preparatory to completing the removal of the battery from the cabinet.

Figure 4 is a plan view taken on irregular line 4—4 of Figure 3.

Figure 5 is a front view of the lower portion of the cabinet with parts in the position of Figure 1 showing a plurality of batteries arranged side by side each supported on and independent of a carrier of this invention.

The battery cabinet to which the carrier of this invention happens to be applied comprises a base 10, a rear wall 12, and a front wall or door 14, if desired, equipped with a window 17 in the ordinary manner. The cabinet is of such a size that at least one vertical column of batteries 16, for sale or display may be placed one above the other, as shown in Figure 1. These columns of batteries may be multiplied by placing additional columns of batteries 18, 20, etc. side by side in the case or cabinet, an independent mechanism of this invention being provided under each column of piled batteries.

The front wall 14 of the cabinet is provided with a perforation 22 of sufficient size so that the bottom battery 16 of a given pile may be horizontally withdrawn from the cabinet first going thru the position of Figure 3, the remaining batteries in the pile then dropping down the thickness of one battery in the obvious manner. Mounted in the cabinet to slide between the positions of Figures 1 and 3 is the load carrying member 24 proper consisting in the particular case here illustrated of two parallel plates or girders 26 and 28 spaced apart at their rear ends by the vertically rising insulating block 30 and spaced apart intermediate of their ends by the studs 32, 34 and 36 whereby there is, as clearly shown in Figure 4, an elongated space or slot 38 running lengthwise of the carrier 24 between the girders 26 and 28. The rear wall 12 of the cabinet is provided with a perforation 39 thru which member 30 reciprocates when carrier 24 moves as described.

The usual construction of the electric battery 16 to whose testing the mechanism of this invention is especially adapted, consists in an outer shell or case containing within it one or more cells 40 (Figure 2) having at one end a terminal 42, being the zinc material of the outside of the cell, and at the other end a carbon terminal 44. In testing a battery prior to sale, to ascertain whether or not it is in usable condition the battery is, in ordinary practice, put into an electric circuit with a small electric lamp and tested to see whether it will give sufficient current to light said lamp. This has heretofore been accomplished by testing the battery after its removal from the storage case or cabinet.

The insulating block 30, heretofore referred to, carries on its side adjacent to the interior of the cabinet, a metallic terminal 46 adapted to engage one terminal as 42 of the battery which happens to be in the bottom of the cabinet and supported on the carrier 24. Pivoted upon stud 36 is a lever or bell crank having two arms 48 and 50 as shown, one of them as 48 carrying a terminal 52 adapted when the parts are in the position of Figure 2 to contact with the other terminal 44 of the battery to be tested. Opposite arm 50 of the lever or bell crank is provided with a pin and slot connection 54 attaching to a horizontally reciprocatable pull bar or draft gear 56 slidable lengthwise inside of the space 38 between the girders 26 and 28 of the carrier 24. This lever 50 provides one support for this draft gear and its opposite end is slidably supported, in the particular case here illustrated, by being provided with a slot 58 thru which the stud 34 passes. A retractile spring 60 suitably connected to stud 32 and to a lug 62 on the draft bar 56 tends to normally hold the draft bar and attached parts in the position of Figures 1 and 3 with reference to the carrier 24. The outer end of the draft bar 56 carries a plate 64 integral with finger handle 66, the former engaging the end of the carrier 24 as shown and limiting the inward movement of the draft bar under the action of spring 60. The parts just described are so proportioned that in the position of Figures 1 and 3 the spring 60 holds lever arm 48 and contact 52 concealed below the upper surface of the carrier 24 as shown in Figures 1 and 3 and that when the operator takes hold of handle 66 and moves it from the position of Figure 1 to that of Figure 2, said movement causes the lever 48 to spring up like a jack in the box and force contact 52 into engagement with terminal 44 of the lower battery 16 to be tested.

On the underside of carrier 24 is a lug 70 connected by spring 72 with a suitable screw 74 in the base 10 of the cabinet. This screw is in electrical connection thru wire 76 with a suitably disposed test lamp 78 which is in turn electrically connected thru wire 80 and connecting device 82 with contact 46 heretofore referred to. The spring 72 serves the function of providing an electrical connection between the screw 74 and the whole of the carrier 24 including arm 48 and contact 52. The spring 72 may also, if desired, be made of sufficient strength to assist in returning the carrier from the positions of Figures 3 and 2 to that of Figure 1 and keeping it in that position.

In operation, the parts are in the position of Figure 1 with at least one battery 16 on the carrier 24, others being, if desired, piled above as shown in Figure 1. The salesman or other person about to remove a battery, the bottom one, for test and use simply takes hold handle 66 and pulls it to the right, first to the position of Figure 2, whereupon the lower battery 16 is in circuit with the lamp 78 so that if the battery is in good order, it sends a current to said lamp thereby lighting it and showing the salesman that the battery is O. K. Having thus ascertained the condition of the battery, with or without stopping his movement of the carrier 24 to the right, the operator or salesman continues to move the carrier outward until the body of the carrier reaches the extended position of Figure 3 with the lug 70 in engagement with some sort of a stop as for instance the wall 84 on the end of base 10. He then releases handle 66 whereupon spring 60 draws draft gear 56 inward to the position of Figure 3, thus getting arm 48 entirely out of the way of the front end of the battery. If there is only one battery in the cabinet and on the carrier, the salesman now takes hold of the battery 16 which is on the carrier and removes it by pulling to the right through the opening 22 whereupon the spring 72 can if strong enough, return the carrier to normal position of Figure 1. If on the other hand, there is a pile of batteries on the carrier as shown in the drawing, the operator after reaching the position of Figure 3 takes hold of the bottom battery 16 and holds it stationary while he pushes upon carrier 24 to return it to the position of Figure 1 where support 30 is outside the cabinet and clear of the batteries descending from above. He then takes hold of the bottom battery 16 and removes it as before whereupon the other batteries 16 piled above it descend by gravity the thickness of one battery thus placing another battery on the carrier ready to be removed and tested by repeating the operation described.

From the foregoing it appears that one pull of the hand on handle 66 simultaneously tests the battery and removes it from the case to readily graspable position; a thing never before done which saves a great deal of time.

Having thus described my invention what I claim as new and desire to secure by Letters Patent, is:—

1. In mechanism of the class described, a carrier member body, means for moving it, an electric circuit leading to the carrier terminating in electric contacts, one supported by the carrier proper, means supporting the other contact movable between two positions by said carrier moving means, for the purposes set forth.

2. In mechanism of the class described, a carrier member body, means for moving it, an electric circuit leading to the carrier terminating in electric contacts, one supported by the carrier proper, means supporting the other contact movable between two positions by said carrier moving means, and an electric test circuit between said contacts in all positions of the carrier, for the purposes set forth.

3. In mechanism of the class described, the combination of a suitable support, a carrier movable thereon, means for manually moving said carrier in the support, a pair of electrical contacts supported by the carrier, one of them movable with reference thereto, an electrical test circuit between said contacts, and means operated by said means for manually moving the carrier for moving said movable electrical contact whereby in one position of said movable contact an electric circuit is established thru an object on the carrier in engagement with the other.

4. In mechanism of the class described, a movable carrier, an insulated member on the carrier supporting an electric contact device at a point remote from the carrier body, a lever pivoted to the carrier movable between two positions, in one of which it is concealed by the carrier and the other of which it is not, a second electric contact carried by the lever so as to be normally concealed in the carrier and movable by said lever from the carrier to a position where it is in line with said first electric contact, a draw bar for the carrier adapted when moved to draw the carrier to move said lever from its concealed position to its extended position, and means providing an electric circuit terminating in said electric contacts, for the purposes set forth.

5. In mechanism of the class described, in combination with a suitable support, a carrier slidable with reference thereto, an insulated electric contact at one end of the carrier adapted to engage one end of an electric battery placed thereon, an electric battery so placed, an arm at the other end of the carrier swingable between two positions in one of which it contacts the opposite terminal of said battery and in the other of which it does not so contact the battery, and pulling means for moving the carrier adapted when pulled to move the carrier to move said lever arm so that it contacts the battery on the carrier, and means for providing an electric circuit between said contact members and thence thru the battery, for the purposes set forth.

6. In mechanism of the class described, a carrier bar, a draw bar for moving the carrier bar limitedly slidable with reference thereto, a pivoted lever on the carrier movable by the movement of the draw bar from a position substantially parallel with the carrier to a position at right angles thereto.

7. In mechanism of the class described, a slidable carrier having a recess running lengthwise thereof, a draw bar slidable lengthwise of said recess to draw the carrier, a pivoted lever normally concealed within the carrier, and an operative connection between the draw bar and the lever whereby pulling the draw bar swings the lever out of the carrier to a position at a substantial angle thereto, for the purposes set forth.

8. In mechanism of the class described, in combination with a case, a carrier slidable along the bottom thereof, to deliver packages contained therein to an opening in the side thereof, a block rising from the end of the carrier at the back of said cabinet adapted to engage the end of an object supported by the carrier to be removed from the cabinet, an insulated electric terminal on said block adapted to bear against an electric terminal on the object in the cabinet to be carried from the cabinet, means on the opposite end of the carrier normally out of contact with the object on the carrier in the cabinet but movable to a position where it is in contact therewith, mechanism for moving said carrier and for simultaneously moving said last mentioned member from non-contacting to contacting position, and means for establishing an electrical connection between the contact on the rear block of the carrier and the contact on the swinging contact member, and thence thru the article carried, for the purposes set forth.

9. In mechanism of the class described, a carrier comprising a pair of side bars spaced apart to make a recess between them, a swinging lever pivoted on the carrier movable between two positions, in one position of which it is practically concealed in the space in the carrier, and the other of which it extends from the carrier at an angle thereto, a draw bar slidable lengthwise of the carrier, a handle for drawing it out of the carrier, a spring for drawing it into the carrier, and a pin and slot connection between the draw bar and lever, whereby moving the draw bar moves the lever between said two positions.

10. In mechanism of the class described, a carrier comprising a pair of side bars spaced apart to make a recess between them, a swinging lever pivoted on the carrier movable between two positions, in one of which it is practically concealed in the space in the carrier, and the other of which it extends from the carrier at an angle thereto, a draw bar slidable lengthwise of the carrier, a handle for drawing it out of the carrier, a spring for drawing it into the carrier, and a pin and slot connection between the draw bar and lever, whereby moving the draw bar moves the lever between said two positions, this in further combination with an electrical contact carried by said lever, an insulated electrical contact carried by the draw bar, and an electric test circuit between said electric contact, for the purposes set forth.

11. In mechanism of the class described, a carrier, for an article to be tested as to whether it can produce an electric current, means for moving the carrier, and an electric testing apparatus actuated by said carrier-moving-means to send a current from an article on the carrier through the testing apparatus preparatory to movement of the carrier.

12. In mechanism of the class described, a carrier for an article to be tested as to whether it can produce an electric current, means for moving the carrier, and an electric testing apparatus actuated by said carrier-moving-means to send a current from an article on the carrier thru the testing apparatus preparatory to movement of the carrier, and while the carrier moves.

13. In mechanism of the class described, a carrier for an article to be tested as to whether it can produce an electric current, means for moving the carrier, and an electric testing apparatus actuated by said carrier-moving-means to send a current from an article on the carrier thru the testing apparatus thruout the whole time while the carrier moves.

14. A movable carrier capable of supporting an article requiring test as to whether it can produce an electric current, electric terminals supported by the carrier leading to a stationary testing apparatus, and means for detachably applying said terminals to the article to be carried, to test it.

15. A carrier, capable of supporting an article requiring test as to whether it can produce an electric current, electric terminals supported by the carrier leading to a testing apparatus, means for detachably applying said terminals to the article to be carried to test it, and means for moving the carrier, adapted in moving the carrier to automatically apply the contacts to the object to be tested.

16. In mechanism of the class described, a cabinet capable of retaining a quantity of batteries, piled one on the other, a carrier at the bottom of the cabinet, slidable thru a suitable opening to remove the bottom battery from the cabinet, and means actuated by the movement of the carrier for automatically connecting the carried battery into an adjacent electric testing set, for the purposes set forth.

17. In mechanism of the class described, a cabinet capable of retaining a quantity of batteries piled one on the other, a carrier at the bottom of the cabinet, slidable thru a suitable opening to remove the bottom battery from the cabinet, and means actuated by the movement of the carrier for automatically connecting the carried battery into an adjacent electric testing set, and maintaining said connection while the battery is being removed from the cabinet, for the purposes set forth.

In witness whereof, I have hereunto subscribed my name in the presence of two witnesses.

JOHN GRAVES.

Witnesses:
O. J. PEDERSON,
O. E. RUHOFF.